United States Patent
Simerly et al.

[11] Patent Number: 5,982,424
[45] Date of Patent: Nov. 9, 1999

[54] CCD CAMERA WITH ADAPTIVE COMPRESSION CONTROL MECHANISM

[75] Inventors: Timothy W. Simerly, Cumming; Arturo A. Rodriguez, Norcross; Neilesh R. Patel, Duluth, all of Ga.

[73] Assignee: Scientific-Atlanta, Inc., Norcross, Ga.

[21] Appl. No.: 08/838,948

[22] Filed: Apr. 23, 1997

[51] Int. Cl.⁶ .......................... H04N 5/235; H04N 5/238
[52] U.S. Cl. ............................. 348/229; 348/364
[58] Field of Search .................................. 348/394, 399, 348/402, 412, 364, 229, 61, 207, 211, 222, 295, 299

[56] References Cited

U.S. PATENT DOCUMENTS

| | | | |
|---|---|---|---|
| 4,768,876 | 9/1988 | Okino | 348/229 |
| 5,264,940 | 11/1993 | Komiya et al. | 348/229 |

*Primary Examiner*—Wendy Garber
*Assistant Examiner*—Alicia M. Harrington
*Attorney, Agent, or Firm*—Kenneth M. Massaroni; Hubert J. Barnhardt, III; Kelly A. Gardner

[57] ABSTRACT

A charge coupled device (CCD) camera includes a CCD imager circuit, a compression engine, and a control circuit coupled to both the CCD imager circuit and the compression engine. The CCD imager circuit is characterized by an integration time defined by clock pulses from the control circuit. The compression engine generates successive frame requests. The control circuit generates the clock pulses to define the integration time based on a time between the sucessive frame requests. The camera further includes a histogram accumulator and an automatic gain controlled (AGC) amplifier coupled between the CCD imager circuit and the histogram accumulator. The CCD imager circuit is characterized by a predetermined maximum imager dynamic range and generates successive frames of imager data values, each successive frame of imager data values being characterized by an imager data value dynamic range and each frame of imager data values being generated based on a corresponding integration time. The AGC amplifier is characterized by an AGC gain defined by a gain control signal and characterized by a maximum output dynamic range. The AGC amplifier processes the successive frames of imager data values into corresponding successive frames of gain controlled data values, each successive frame of gain controlled data values being characterized by a gain controlled data value dynamic range. The histogram accumulator processes a first frame of gain controlled data values to determine a first frame result. The control circuit generates the clock pulses based on the first frame results to define the integration time that corresponds to a second frame of imager data values so that the integration time is maximized while the imager data value dynamic range is less than the maximum imager dynamic range, and the control circuit further generates the gain control signal based on the first frame results and the maximum imager dynamic range to minimize the AGC gain required so that the gain controlled data value dynamic range is equal to a predetermined range within the maximum output dynamic range.

23 Claims, 4 Drawing Sheets

CCD CAMERA WITH ADAPTIVE COMPRESSION CONTROL MECHANISM

BACKGROUND OF THE INVENTION

1. Field of the Invention

The present invention relates to video telephone systems. In particular, the invention relates to adaptive control of a CCD camera to simplify and speed computations needed in a compression engine such as discrete cosine transforms of video conference standard H.263 or an MPEG compression engine.

2. Description of Related Art

CCD cameras are known. A CCD camera includes a CCD imager IC (a large CCD integrated circuit) and control circuits typically mounted on a printed wiring assembly. The CCD imager IC includes a two dimensional array of photosites. In a CCD imager IC, the photosites are exposed to an imaging fight for a short integration period. At the end of the integration time, the charge accumulated in the photo sites are typically parallel transferred rapidly to a plurality of vertical shift registers (protected from further exposure to light) and then serially shifted down to a horizontal shift register. The end element of each vertical shift register forms a plurality of parallel signals. This plurality of parallel signals are rapidly parallel transferred into the horizontal shift register. From there, the horizontal shift register is clocked serially to transfer the charge to an output circuit for the CCD imager IC. When all elements of the horizontal shift register are transferred out of the CCD imager IC, the plurality of vertical shift registers are again clocked once to make a new vertical shift register element available from each vertical shift register for parallel transfer into the horizontal shift register. By this process, the CCD imager IC produces a serial signal that corresponds to a raster scan such as for an NTSC compatible signal.

When such a CCD camera is used with an H.263 or MPEG compression engine, compressed video results. Since CCD imager ICs are typically designed for compatibility with NTSC (or PAL for Europe) signal generation, the H.263 or MPEG compression engine is designed to use the input of the NTSC signal. The CCD imager IC has a variety of control parameters that must be specified and are usually controlled by a signal from outside of the CCD imager IC. For example, the integration time, and the clock rates of the vertical and horizontal shift registers. A number of anti-blooming and charge reset features are usually provided, and these too are controlled by signals from outside of the CCD imager IC. In color cameras, even more control is effected from outside the imager IC. Sometimes the imager IC architecture provides even more flexibility, such as the selective control to average a 2 by 2 array of pixels to reduce resolution and reduce output bandpass requirements. Known CCD cameras uses these control signals to selectively switch between, for example, an NTSC signal and a PAL signal, or between black and white and color.

SUMMARY OF THE INVENTION

It is an object to the present invention to achieve a charge coupled device (CCD) that controls a CCD imager IC and signal processing to dynamically adapt so as to minimizoptimize computation requirements on a compression engine rather than control the CCD camera to generate an NTSC signal that must later be compressed in an MPEG compression engine.

This and other objects are achieved in a CCD camera that includes a CCD imager circuit, a compression engine, and a control circuit coupled to both the CCD imager circuit and the compression engine. The CCD imager circuit is characterized by an integration time defined by clock pulses from the control circuit. The compression engine generates successive frame requests. The control circuit generates the clock pulses to define the integration time based on a time between the sucessive frame requests. The camera further includes a histogram accumulator and an automatic gain controlled (AGC) amplifier coupled between the CCD imager circuit and the histogram accumulator. The CCD imager circuit is characterized by a predetermined maximum imager dynamic range and generates successive frames of imager data values, each successive frame of imager data values being characterized by an imager data value dynamic range and each frame of imager data values being generated based on a corresponding integration time. The AGC amplifier is characterized by an AGC gain defined by a gain control signal and characterized by a maximum output dynamic range. The AGC amplifier processes the successive frames of imager data values into corresponding successive frames of gain controlled data values, each successive frame of gain controlled data values being characterized by a gain controlled data value dynamic range. The histogram accumulator processes a first frame of gain controlled data values to determine a first frame result. The control circuit generates the clock pulses based on the first frame results to define the integration time that corresponds to a second frame of imager data values so that the integration time is maximized while the imager data value dynamic range is less than the maximum imager dynamic range, and the control circuit further generates the gain control signal based on the first frame results and the maximum imager dynamic range to minimize the AGC gain required so that the gain controlled data value dynamic range is equal to a predetermined range within the maximum output dynamic range.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

A special ASIC is made to perform signal processing and certain control functions. The signal processing first converts RGB (red, green, blue) represented signals into YCrCb (intensity, red chroma, blue chroma) signals. Next the Y signal is adjusted for monitor non-linearity in a Gamma Correction Filter. CCD camera are typically very linear, and therefore, require no correction. Next the chroma signals are adjusted for white balance. The results of the white balance and chroma adjustment are then format converted and sent to a frame buffer. The input of ASIC is collected in a histogram accumulator from which statistics are derived for feedback control.

The control signals into the CCD imager IC enable control of the pixel integration time, frame rate, raster fine rate, a progressive vs. interleaved scan switch and picture size. These signal are sent through the clock driver circuit.

Additional signals are sent through a serial D/A converter to drive the optics (focus and zoom) and a level shifter (depicted as a summer in the signal processing chain after the AGC).

Common mode noise in the signal from the CCD card is minimized with a correlated double sample filter that is controlled by a signal from the ASIC. The signal from the correlated double sample filter is passed to the AGC to operate in coordination with the level shifter (both controlled by the ASIC) to maximize the signal to noise ratio and dynamic range of the signal being processed. The signal from the level shifter is converted to a digital word to be processed by the ASIC signal processor. The output of the ASIC signal processor is buffered in a frame buffer. The MPEG compressor operates on data from the frame buffer.

Figure 1:
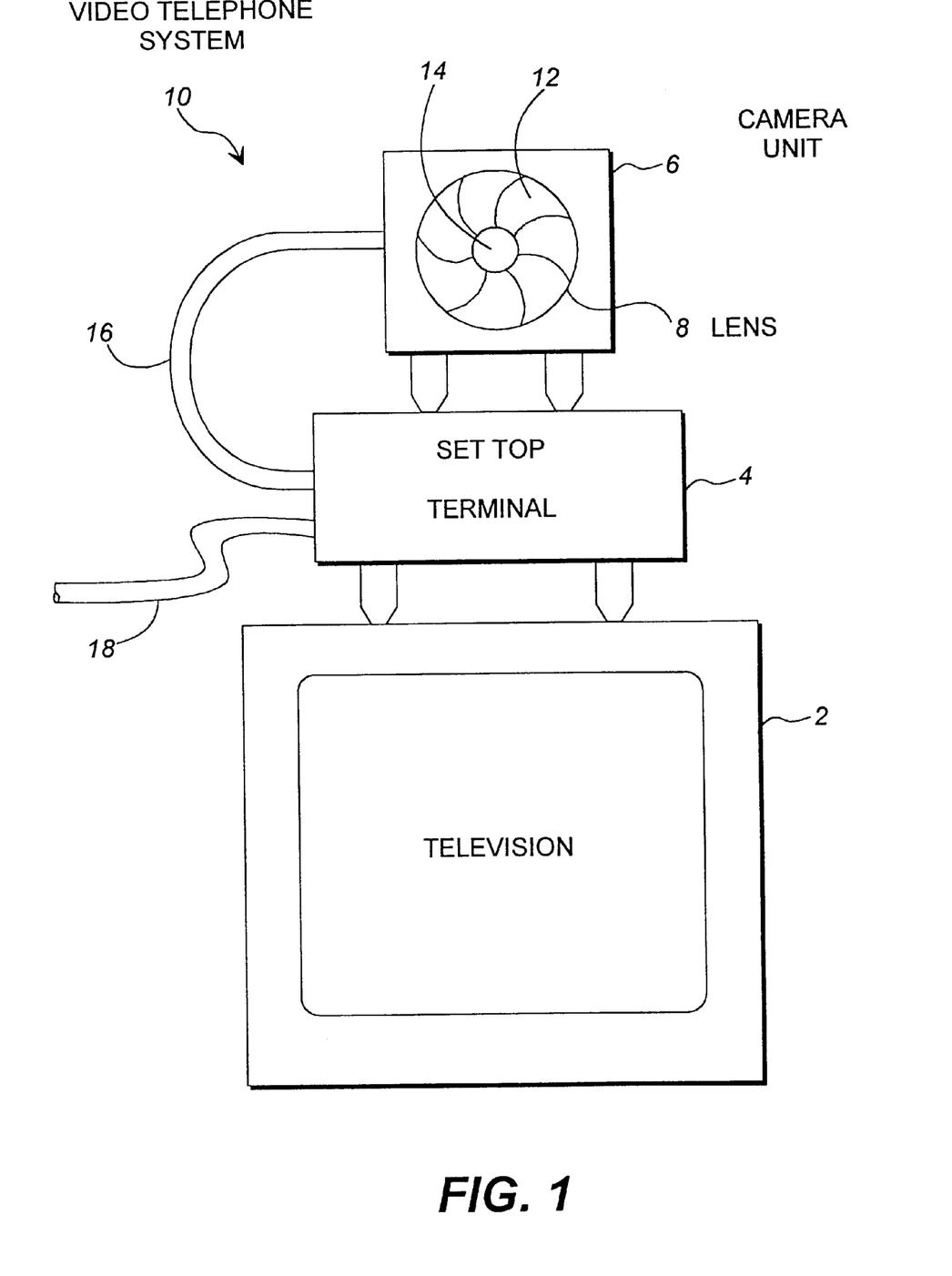
FIG. 1 is a schematic diagram of a video telephone system.

FIG. 1 depicts video telephone system 10 that includes television 2 (or similar monitor or display device), set top terminal 4, camera unit 8, camera unit cable 16 and communications cable 18, for example as may be used in a two-way cable television distribution system. Camera unit 6 includes lens 8 having iris 12 and optical passing portion of lens 14.

Figure 2:
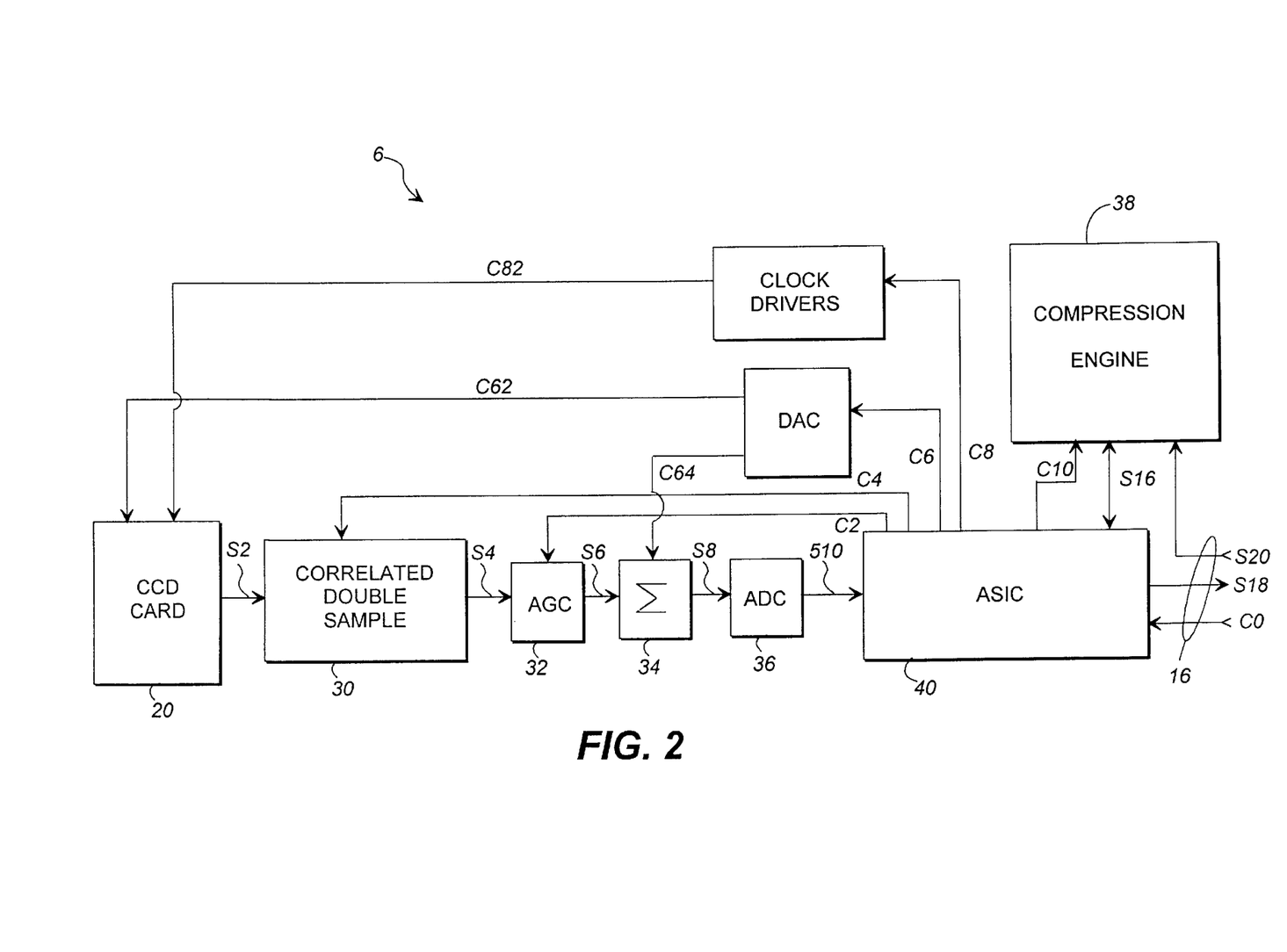
FIG. 2 is a block diagram of a camera unit.

FIG. 2 depicts camera unit 6 that includes CCD card 20, correlated double sample filter 30, automatic gain control 32, level shifter 34, analog to digital converter 36, applications specific integrated circuit (ASIC) signal processor 40, compression engine 38, clock drivers and serial digital to analog converters. Camera unit cable 16 includes video input line S20 and video output line S18 and control input CO.

In operation, CCD card 20 generates a video signal (e.g., an analog signal) that is carried over video line S2 and provided as inputs to correlated double sample filter 30. The video signal carried over video line S2 is preferably a raster scanned signal of lines of pixels. For example, the raster scan may represent 720 pixels by 480 pixels. Each pixel is associated with a color of a mask matrix (described below).

Correlated double sample filter 30 samples the input video signal twice during each pixel duration according to the timing of control signal C4. Control signal C4 may include two signals that cause respective samples to be taken at two distinct times within the pixel duration, for example, at 25% and 75% of the pixel duration as measured from the start of the pixel. Correlated double sample filter 30 subtracts the two samples to remove common mode noise. The signal difference (e.g., an analog signal) between the two samples is passed over video line S4 to automatic gain control circuit 32. Automatic gain control circuit 32 includes an amplifier with digitally controlled gain (e.g., controlled by control signal C2) that provides a video signal on video line S6 as a scaled replica of the video signal on video line S4.

The scaled video signal (e.g., an analog signal) is carried on video line S6 to level shifter 34. Level shifter 34 adds an analog value on control line 64 to the scaled video signal on video line S6. AGC circuit 32 and level shifter 34 combine with control circuitry in ASIC 40 to form a control loop to maximize the signal-to-noise ratio and dynamic range of the color images. The control circuitry in ASIC 40 generates digital control signals C2 and C6, and digital control signal C6 is converted by digital-to-analog converter DAC into analog control signal C64.

The video signal on video line S8 is provided to analog to digital converter circuit 36. Analog to digital converter circuit 36 converts the video signal into a digital word. Analog-to-digital converter 36 is controlled ASIC 40 to sample each pixel at an optimal time within the pixel duration. ASIC 40 is able to sample the pixels at an optimal sample time since ASIC 40 also controls the pixel, horizontal line and frame clock pulses provided over control line C8 to CCD card 20 as described below. The digital value is encoded into a plurality of binary bit levels, preferably 10 bits in length. The output of analog-to-digital converter 36 is provided to ASIC 40 over digital busses S10, preferably 10 bits wide. It will be appreciated that a single high speed serial bus S10 may be employed as an alternative to a parallel bus.

Control circuitry in ASIC 40 generates control signal C4 to control correlated double sample filter 30. Control logic in ASIC 40 generates control signal C6, preferably serial. Serial control signal C6 is provided to a serial digital to analog converter DAC. Parallel arrangements are equivalent. Preferably, the serial digital to analog converter includes two output sample and hold circuits (not shown) so that control signal C6 may be time multiplexed to generate two analog control signals C62 and C64.

Analog control signal C64 is applied to level shifter (i.e., adder circuit) 34 to adjust the dc level of the video signal on video line S8. Control signal C64 is lowered when it necessary to lower the maximum amplitude of the video signal on video line S8 to avoid saturation and non-linear performance. Signal C64 is raised whenever it is permissible to raise the peak amplitude of the video signal on video lines S8 without causing saturation or non-linear performance.

The dynamic range of the video signal is adjusted by a scale factor provided by a control signal on control line C2. The gain of AGC 32 is increased (and control signal C64 adjusted to avoid saturation) until the minimum voltage of the videosignal on video line S8 is just above the negative saturation point or non-linear performance point while the maximum voltage is just below the positive saturation point.

Control signal C62 controls motors for camera lens 8 FIG. 1) so as to control focal length and possibly the aperture iris or pan or scroll. In many applications iris control is unnecessary since the same function can be controlled by the duration of the CCD integration time as discussed below. Some applications of this invention may have manual focus, for example, as in fixed range systems where focus re-adjustment is seldom required. With manual focus and integration duration control substituted for iris control, there in no need for motors in the camera and no need for control signal C62.

Control circuitry within ASIC 40 generates control signal C8 in the form of a plurality of clock signals amplified and possibly level shifted by clock drivers to generate control signals C82. Control signals C82 directly control the CCD imager IC in the CCD card 20 and generally include a pixel clock signal, a horizontal line clock signal and a frame clock signal. Each CCD imager IC requires manufacturer dependent control signals, thus, the specific control signals may vary. In general, the pixel clock signal includes 2, 3 or 4 clock phases. In four clock phase systems, the clock pulses themselves provide an opportune source of timing for control signal C4 when correlated double sample filter 30 samples at a 25% and 75% point in the pixel duration. Horizontal line clock pulses transfer data from the end of a vertical shift registers to the horizontal shift register to be clocked out by pixel clock pulses. Frame clock pulses transfer data from pixel integration sites into the vertical shift registers and begin a new integration period.

By controlling time intervals between the pixel, horizontal line and frame clock pulses it is possible to vary the integration. Known hand held video cameras (e.g., as may be used in home movie recording) control the timing of the clock pulses so that the camera generates a video signal that is compatable with pixel rates, line rates and frame rates (e.g., interleaved) that are defined in well known standards such as NTSC in the U.S. or PAL in Europe. In contrast, the present invention controls the timing of the clock pulses to be compatable with and optimize an MPEG compression engine as discussed below.

Figure 3:
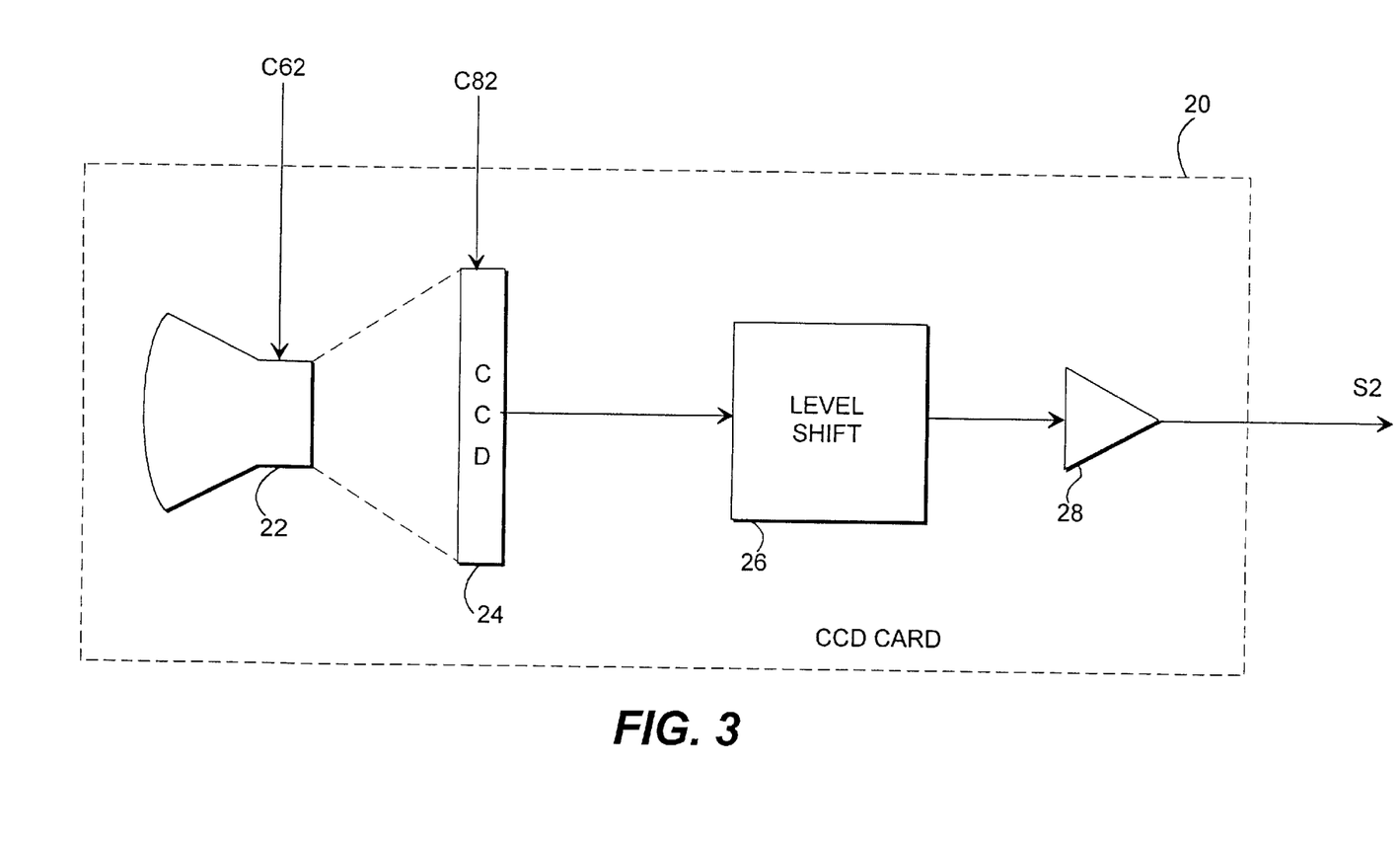
FIG. 3 is a schematic diagram of a CCD card.

FIG. 3 depicts CCD card 20 that includes lens control circuits 22, CCD imager IC 24, level shifter 26 amplifier 28. Control signal C62 control the focus and aperture opening of lens 8 (FIG. 1) and possibly pan or scroll functions, if needed. Typically these motor driven components are mounted on an exterior chassis of camera unit 6 so as to focus imaging light on a focal plane at which CCD imager IC 24 (mounted on CCD card 20) is fixedly disposed. As discussed above, when the CCD integration time is used to control exposure light instead of the iris control, and when the camera has a manual focus (or fixed focus), lens control circuits 22 and control signal C62 are omitted.

CCD imager IC 24 generates an output signal that is level shifted in level shifter 26, if necessary, and amplified in amplifier 28 to transmit the video signal over video line S2.

Figure 4:
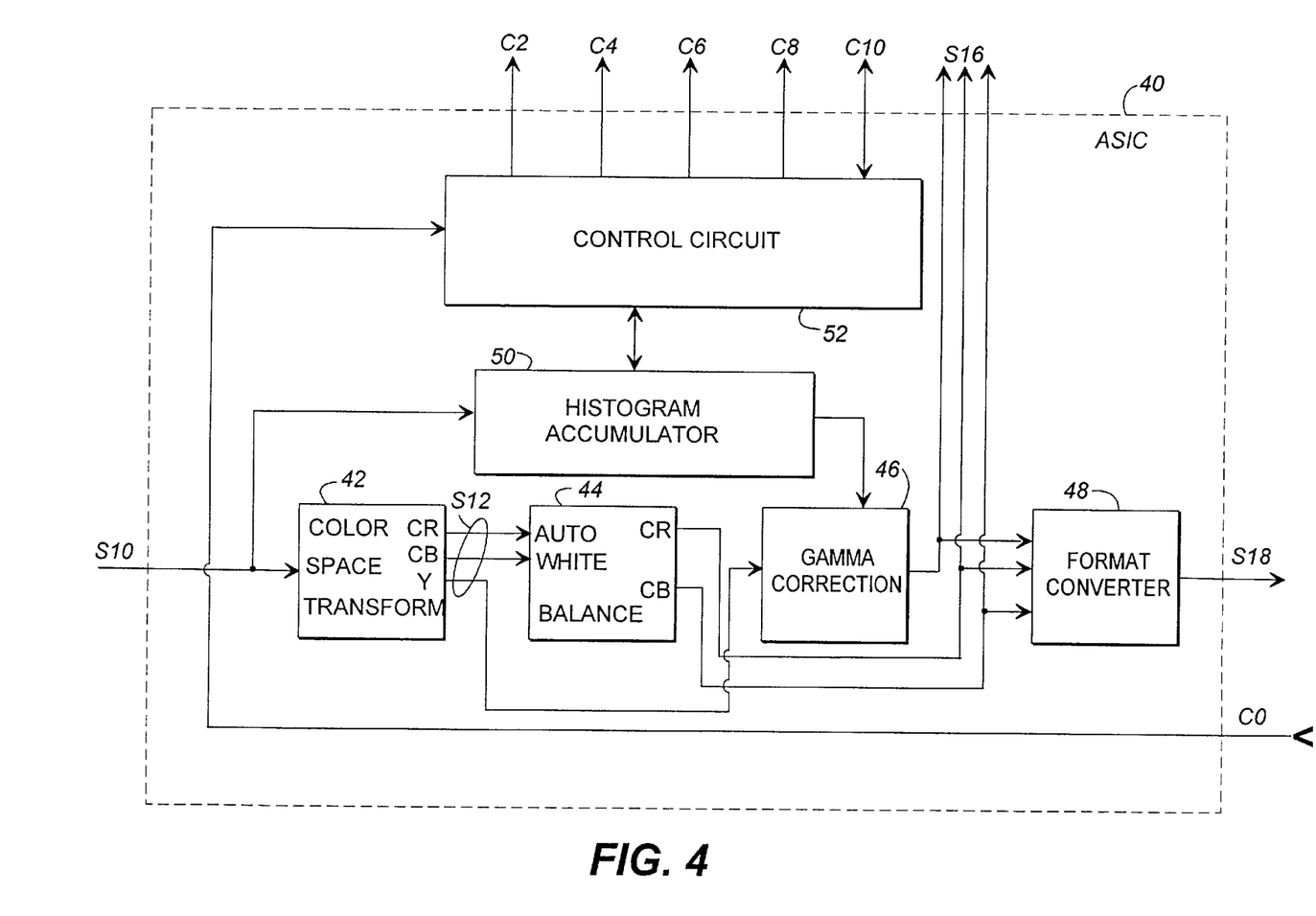
FIG. 4 is a circuit schematic diagram of an ASIC signal processor.

FIG. 4 depicts ASIC 40 that includes color space transform 42 to provide luminance Y and chrominance Cr and Cb, auto white balance circuit 44 coupled to chrominance Cr and Cb, gamma correction filter 46 coupled to luminance Y, format converter 48, histogram accumulator 50 and control circuit 52.

Each input signal word on bus S10 to ASIC 40 represents one pixel out of an array of pixels formed in a single frame by CCD imager IC 24. For example, the array may be 720 pixels in each of 480 horizontal lines. CCD imager IC 24 includes a mask matrix of color filters so that each pixel in the array is responsive to the intensity of a particular color of light impinging a pixel during the integration time. Color filters for red, green and blue are disposed in the mask matrix in a predetermined pattern. Thus, the succession of pixel sample words on digital bus S10 reflect particular colors intensities in a predetermined order. The present invention operates as well with other color filter combinations, for example, complementary filters for yellow, magenta and cyan may advantageously be used.

Color space transform 42 converts, according to the predetermned order of the mask matrix, the digital video signal words on video bus S10 by interpolating between pixels of like color and matrix transforming the resampled colors into luminance signal word Y, preferably 8 bits in length, and two chromance signal words Cr and Cb, each preferably 8 bits in length. The luminance signal word Y is formed by combining the three colors, red, green and blue. The chrominance signal word Cr is formed by subtracting luminance from red. The chrominance signal word Cb is formed by subtracting luminance from blue. Luminance signal word Y output from color space transform 42 passes over a digital line of three digital lines S12 to gamma correction filter 46. The two chromance signal words Cr and Cb output from color space transform 42 pass over two digital lines of three digital lines S12 to auto white balance circuit 44.

Gamma correction filter 46 implements a luminance correction to adjust for non-linearty in the monitor light responsiveness to signals input into the monitor. Generally this is a predetermined non-linear scaling function that may be approximated by either a piece-wise linear relationship or a look-up table. It is preferrably predetermined based on the general responsivity of commonly known or standard monitors. The gamma corrected luminance signal is provided over one of signal lines S16 to format converter 48 and compresssion engine 38.

Auto white balance circuit 44 adjusts (e.g., by scaling) the relative values for chrominance Cr and chrominance Cb on a pixel by pixel basis according to two constants Kr and Kb. A human eye perceives different colors according to known responsivities to the intensity of different colors, and CCD imager IC 24 responds to different colors according to known, but different, responsivities to the intensity of different colors. To cause the camera image to be displayed with a color balance (e.g., orange versus blue light effects) that matches the human eye, it is necessary to correct this mismatch. This is performed by simply scaling the chrominance Cr signal and chrominance Cb signal on a pixel by pixel basis according to constants Kr and Kb. This balance is largely a heuristic developed balance by each camera maker, whereas the gamma correction is largely a well known correction function.

Alternatively, the white balance function may be directly performed on the data received from bus S10 in the front end of color space transformation in circuit 42 using three constants Kr, Kg and Kb for scaling pixel amplitudes associated with respective red, green and blue pixel filters (or other color combinations, e.g., yellow, magenta and cyan). Thus, with each pixel having been scaled according to the white balance constants, the pixels are further processed in color space transform 42 as described above. The chromance Cr and Cb outputs of color space transform circuit 42 is passed directly to format converter 48 and data bus S16 thus bypassing auto white balance circuit 44 depicted in FIG. 4 since the white balance function is performed in the front end of color space transform circuit 42. The luminance Y output of color space transform circuit 42 is still scaled by gamma correction circuit 46 as depicted in FIG. 4.

Indoor evening color balance under incandescent lighting might have more orange and less blue content when compared to outdoor daytime lighting at the side of a swimming pool during summer. One approach for determining this color balance is to fix scaling numbers for each of the chrominance Cr signal and chrominance Cb signal based on a predetermined compromise between indoor lighting conditions and outdoor lighting conditions. Another approach is to have a predetermined light generator (e.g., an array of different color light emitting diodes) with known color balance disposed in front of the camera for a calibration mode. ASIC 40 recognizes the calibration mode, locates the array of light emitting diodes within an image, preferably by their fixed known pattern or arrangement, and then compares the known color balance with the color balance in the rest of the scene. In this way the color balance in the rest of the scene is characterized against a known color balance, and the scaling values used to define the color balance correction in auto white balance circuit 44 is set accordingly.

The balanced chrominance Cr signal and chrominance Cb signal output of auto white balance circuit 44 are provided to format conversion 48 and compression engine 38 over two busses of the three digital busses S16. Compression engine 38 encodes the image wise data in, for example, an MPEG compressed format. The compressed data is to be provided to the outgoing signal. At the same time, format conversion circuit 48 ensures that the correct number of pixels per line and lines per frame are provided to output video lines S18 (and from there to monitor 2 of FIG. 1).

Digital busses S16 are preferably two-way busses. Incoming signals from cable 2 of FIG. 1 pass through set top terminal 4 into camera unit 6 and from there over camera unit cable 16 to compression engine 38 which de-compresses a compressed video image. The de-compressed video image is passed over two-way busses S16 into format conversion unit 48. From there, format conversion unit 48 prepares the raster scan image in a correct format to be transmitted over video lines S18 to monitor two of FIG. 1. Other embodiments that use one way busses that are equivalent may be used.

Histogram accumulator 50 accumulates statistics on the images on a frame by frame basis. For each frame, each digital word from digital bus S10 is accumulated in a bin corresponding to the value of the word. For an extreme example, since digital words on bus S10 are 10 bits in lengths, 1024 bins are used to accumulate each possible value in a unique bin. From the histogram produced, it is easy to determine the maximum value and minimum value of the pixels in the frame. In a more practical example, the digital values may be quantified into only 32 bins.

One function performed by control circuit 52 of ASIC 40 is to determine values for control words C2 and C6 (when converted into analog signal C64) to be used in the coming frame based on the histogram generated for the prior frame. Control word C2 defines the contrast (dynamic range) of the signal by varying the gain of the AGC amplifier. Control word C6 (when converted into analog signal C64) defines the signal's brightness by raising or lowering the average signal value between the bright and dark extremes. The dynamic range and median dc level between the maximum and minimum values in the histogram, as measured in the past frame, is used to define the AGC amplifier gain and dc level shift of signals to be processed in the coming frame so that similarly distributed digital values on bus S10 will have full dynamic range (i.e., contrast) without saturating at either the positive or negative extremes.

Since the dynamic range and median dc level of the coming frame may be different that the dynamic range and median dc level of the prior frame, the AGC amplifier gain is preferably reduced by a margin from the gain that would result in full dynamic range, and the dc level shift adjusted to center the dynamic range between the reduce positive and negative extremes of the reduced dynamic range. For example, the margin may be set to 10% so that the reduced dynamic range is 90% of a maximimum possible dynamic range (i.e., all 10 bits of the signal on line S10) to account for variations between frames in the distribution of pixel values.

In another embodiment, signals beyond the above described margin limits (e.g., beyond the 90% reduced dynamic range) are equalized by compressing the signal value when the value is not within the reduce dynamic range. This is accomplished in gamma correction circuit 46 with an additional look-up table. The dynamic range of pixel values from the prior frame is determined in histogram accumulator 50. Control signal C2 and C64 are determined to scale this dynamic range into, for example, 90% of the prior frame's measured dynamic range. Then, for a signal word with a value beyond this 90% range, a new compression look-up table is used in gamma correction circuit 46 to avoid saturation. The visual result at the extreme positive (very bright) and negative (very dark) values is a reproduced image that is not faithfully reproduced as to brightness (at the extremes) but contains enhanced contrast for bright images (e.g., light balbs) and dark images (e.g., the inside of a closet).

Compression engine 38 is preferably designed to require 10 to 15 image frames per second based on a video compression algorithm (e.g., discrete cosine transform DCT as described in video conferencing standard compression algorithm H.263 or an MPEG compression algorithm) and depending mostly on the motion in the image; however, as few as 5 and as many as 20 image frames may occasionally be required. The frame rate required varies from frame to frame. This contrasts with fixed raster scan camera systems that require, for example, 30 frames per second with 2 interleaved fields each as in the NTSC standard.

In the present invention, compression engine 38 sends a control signal over two-way control line C10 to control circuit 52 of ASIC 40 to indicate in advance of a need for a new frame of data. Alternative designs using one way lines for control line C10 are equivalent.

In a preferred embodiment, control circuit 52 of ASIC 40 determines the time interval available to collect the new frame of data. The time interval between the last two requests for new data frames from compression engine 38 (less some margin for frame to frame variations) may be used as an estimate of the time available. Control circuit 52 generates clock pulses on line C8 that adjust the integration time according to the expected available time to collect a frame of data. Control signal C8 (i.e., the clock pulses that control CCD imager IC 24) is controlled to adjust the CCD integration time to achieve maximum signal to noise ratio in the signals provided to compression engine 38.

In low light situations, control circuitry 52 generates C8 to permit as much integration time in CCD imager IC 24 as is allowed by the time available to collect the data frame. A low light situation is defined as one where the light intensity impinging on CCD imager IC 24 is not expected to cause accumulated charge overflow the charge integration sites during the available time to collect the data frame. This provides the maximum signal (and signal to noise ratio). The maximum charge that can be accumulated in a pixel before overflow (blooming) is defined by the manufacturer of CCD imager IC 24. The actual charge accumulated in the pixels of a data frame are characterized by the value of the digital words on digital bus S10, and the maximum actual charge accumulated is determined from the histogram. Any deficit in achieving a desired full or reduced dynamic range (contrast), as may be experienced during extremely low light levels, is corrected by adjusting the AGC amplifier gain by control circuit 52 providing a digital control word defining the desired gain on control line C2. The dc level (brightness) may be corrected by adjusting control signals C2 and C64.

High light situations are defined where charge overflow would occur during the integration period if the integration period were allowed to extend to the full time available to collect the data frame. In high light situations, clock pulses on control line C8 are controlled to limit the integration time to less than the full time available to prevent overflow of any pixel. In fact, it is preferred that the integration time be determined so as to leave a margin (e.g., 10%) between the maximum charged collected during a prior frame (based on the histogram) and the maximum charge collectable before overflow (based on specifications from the manufacturer of CCD imager IC 24). This margin will accommodate frame to frame variations in light level. Once control circuit 52 determines the integration time, the clock pulses on control line C8 are generated to produce the desired integration time. Additional gain in AGC 32, which also increases noise, is not required, and an improved signal to noise ratio is achieved.

Thus, the time between clock pulses (e.g., as controlled by control signal C8) is caused to dynamically vary as determined in ASIC 40 based on compression engine frame rate requirements and the intensity of impinging light on a frame by frame basis. Sampling control of correlated double sample filter 30 (as controlled by control signal C4) is also adapted in phase to vary with the clock pulses on the same frame by frame basis. The sample rate and phase of ADC 36 to sample each pixel is also adapted to vary with the clock pulses on a frame by frame basis. Control signals C2 and C64 are also caused to vary from frame to frame.

In this embodiment, the period between clock pulses, carried on control line C8, that drive CCD imager IC 24 is dynamically varied according to measured histogram results and the required frame rate for compression engine 38. In this way, a maximum signal to noise ratio is achieved in the signal processed through ASIC 40.

Having described preferred embodiments of a novel apparatus to adaptively control a CCD camera (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A charge coupled device (CCD) camera, comprising:
   a CCD imager circuit;
   a compression engine; and
   a control circuit couples to both the CCD imager circuit and the compression engine,
   wherein:
      the CCD imager circuit is characterized by an integration time defined by clock pulses from the control circuit;
      the compression engine generates successive frame requests; and
      the control circuit generates the clock pulses to define the integration time based on a time between the successive frame requests.

2. The camera of claim 1, further comprising a histogram accumulator and an automatic gain control (AGC) amplifier coupled between the CCD imager circuit and the histogram accumulator wherein:
   the CCD imager circuit generates successive frames of imager data values, each frame of imager data values being generated based on a corresponding integration time;
   the AGC amplifier processes the successive frames of imager data values into corresponding successive frames of gain controlled data values;
   the histogram accumulator processes a first frame of gain controlled data values to determine a first frame result; and
   the control circuit generates the clock pulses based on the first frame results to define the integration time that corresponds to a second frame of imager data values.

3. The camera of claim 2, wherein:
   each successive frame of gain controlled data values is characterized by a gain controlled data value dynamic range;
   the AGC amplifier is further characterized by a maximum output dynamic range; and
   the control circuit generates the gain control signal based on the first frame results to control the AGC gain so that the gain controlled data value dynamic range is equal to a predetermined range within the maximum output dynamic range.

4. The camera of claim 3, wherein the predetermined range is substantially equal to the maximum output dynamic range.

5. The camera of claim 4, further comprising a gamma correction circuit and a color space transform circuit coupled between the AGC amplifier and the gamma correction circuit wherein:
   the color space transform circuit processes successive frames of gain controlled data values into successive frames of luminance data values; and
   the gamma correction circuit transforms a first luminance data value into a corrected first luminance value based on a linearizing function defined to make linear a response by an associated monitor to the corrected first luminance value.

6. The camera of claim 3, wherein the predetermined range plus a predetermined range margin equals 100% of the maximum output dynamic range.

7. The camera of claim 6, further comprising a gamma correction circuit and a color space transform circuit coupled between the AGC amplifier and the gamma correction circuit wherein:
   the color space transform circuit processes successive frames of gain controlled data values into successive frames of luminance data values;
   the gamma correction circuit transforms a first luminance data value into a corrected first luminance value based on a linearizing function defined to make linear a response by an associated monitor to the corrected first luminance value when the first luminance data value is within the predetermined range; and
   the gamma correction circuit transforms the first luminance data value into the corrected first luminance value based on a compression function when the first luminance data value is not within the predetermined range, the compression function mapping the first luminance data value into a value within the predetermined range margin.

8. The camera of claim 1, further comprising a histogram accumulator and an automatic gain controlled (AGC) amplifier coupled between the CCD imager circuit and the histogram accumulator wherein:
   the CCD imager circuit generates successive frames of imager data values;
   the AGC amplifier is characterized by an AGC gain defined by a gain control signal and processes the successive frames of imager data values into corresponding successive frames of gain controlled data values;
   the histogram accumulator processes a first frame of gain controlled data values to determine a first frame result; and
   the control circuit generates the gain control signal based on the first frame results.

9. The camera of claim 8, wherein:
   each frame of imager data values is generated based on a corresponding integration time; and
   the control circuit generates the clock pulses based on the first frame results to define the integration time that corresponds to a second frame of imager data values.

10. The camera of claim 9, wherein:

each successive frame of gain controlled data values is characterized by a gain controlled data value dynamic range;

the AGC amplifier is further characterized by a maximum output dynamic range; and the control circuit generates the gain control signal to control the AGC gain so that the gain controlled data value dynamic range is equal to a predetermined range within the maximum output dynamic range.

11. The camera of claim 10, wherein the predetermined range is substantially equal to the maximum output dynamic range.

12. The camera of claim 11, further comprising a gamma correction circuit and a color space transform circuit coupled between the AGC amplifier and the gamma correction circuit wherein:

the color space transform circuit processes successive frames of gain controlled data values into successive frames of luminance data values; and the gamma correction circuit transforms a first luminance data value into a corrected first luminance value based on a linearizing function defined to make linear a response by an associated monitor to the corrected first luminance value.

13. The camera of claim 10, wherein the predetermined range plus a predetermined range margin equals 100% of the maximum output dynamic range.

14. The camera of claim 13, further comprising a gamma correction circuit and a color space transform circuit coupled between the AGC amplifier and the gamma correction circuit wherein:

the color space transform circuit processes successive frames of gain controlled data values into successive frames of luminance data values;

the gamma correction circuit transforms a first luminance data value into a corrected first luminance value based on a linearizing function defined to make linear a response by an associated monitor to the corrected first luminance value when the first luminance data value is within the predetermined range; and the gamma correction circuit transforms the first luminance data value into the corrected first luminance value based on a compression function when the first luminance data value is not within the predetermined range, the compression function mapping the first luminance data value into a value within the predetermined range margin.

15. The camera of claim 1, further comprising:

a color space transform circuit;

an automatic gain controlled (AGC) amplifier coupled between the CCD imager circuit and the color space transform circuit; and a color balance circuit circuit coupled to the color space transform circuit.

16. The camera of claim 15 wherein:

the CCD imager circuit generates successive frames of imager data values;

the AGC amplifier processes the successive frames of imager data values into corresponding successive frames of gain controlled data values;

the color space transform circuit processes successive frames of gain controlled data values into successive frames of red chrominance data values and successive frames of blue chrominance data values; and the color balance circuit processes red and blue chrominance data values into corresponding balanced red and blue chrominance values.

17. The camera of claim 16, wherein:

the balanced red chrominance values are proportional to corresponding red chrominance data value based on a first proportional constant;

the balanced blue chrominance values are proportional to corresponding blue chrominance data value based on a second proportional constant; and the color balance circuit includes a memory storing predetermined first and second proprotional constants.

18. The camera of claim 16, further comprising a calibration lamp disposed to cast light on the CCD imaging circuit wherein:

the CCD imaging circuit generates imager data values corresponding to light from the calibration lamp and generates imager data values corresponding to light from a scene casting light upon the CCD imaging circuit;

the balanced red chrominance values are proportional to corresponding red chrominance data value based on a first proportional constant;

the balanced blue chrominance values are proportional to corresponding blue chrominance data value based on a second proportional constant;

the color balance circuit includes a memory storing predetermined first and second proprotional constants;

the control circuit includes circuitry to measure a known color balance from the imager data values corresponding to light from the calibration lamp and to measure an unknown color balance from the imager data values corresponding to light from the scene; and the control circuit further determines the first and second proportional constants based on the known color balance and the unknown color balance.

19. The camera of claim 1, further comprising a histogram accumulator and an automatic gain controlled (AGC) amplifier coupled between the CCD imager circuit and the histogram accumulator wherein:

the CCD imager circuit is characterized by a predetermined maximum imager dynamic range and generates successive frames of imager data values, each successive frame of imager data values being characterized by an imager data value dynamic range, each frame of imager data values being generated based on a corresponding integration time;

the AGC amplifier is characterized by an AGC gain defined by a gain control signal and characterized by a maximum output dynamic range, the AGC amplifier processing the successive frames of imager data values into corresponding successive frames of gain controlled data values, each successive flame of gain controlled data values being characterized by a gain controlled data value dynamic range;

the histogram accumulator processes a first frame of gain controlled data values to determine a first frame result;

the control circuit generates the clock pulses based on the first frame results to define the integration time that corresponds to a second frame of imager data values so that the integration time is maximized while the imager data value dynamic range is less than the maximum imager dynamic range; and the control circuit further generates the gain control signal based on the first frame results and the maximum imager dynamic range to minimize the AGC gain required so that the gain controlled data value dynamic range is equal to a predetermined range within the maximum output dynamic range.

20. The camera of claim 19, wherein the predetermined range is substantially equal to the maximum output dynamic range.

21. The camera of claim 20, further comprising a gamma correction circuit and a color space transform circuit coupled between the AGC amplifier and the gamma correction circuit wherein:

the color space transform circuit processes successive frames of gain controlled data values into successive frames of luminance data values; and the gamma correction circuit transforms a first luminance data value into a corrected first luminance value based on a linearizing function defined to make linear a response by an associated monitor to the corrected first luminance value.

22. The camera of claim 19, wherein the predetermined range plus a predetermined range margin equals 100% of the maximum output dynamic range.

23. The camera of claim 22, further comprising a gamma correction circuit and a color space transform circuit coupled between the AGC amplifier and the gamma correction circuit wherein:

the color space transform circuit processes successive frames of gain controlled data values into successive frames of luminance data values;

the gamma correction circuit transforms a first luminance data value into a corrected first luminance value based on a linearizing function defined to make linear a response by an associated monitor to the corrected first luminance value when the first luminance data value is within the predetermined range; and the gamma correction circuit transforms the first luminance data value into the corrected first luminance value based on a compression function when the first luminance data value is not within the predetermined range, the compression function mapping the first luminance data value into a value within the predetermined range margin.

* * * * *